July 26, 1949.　　　　S. G. GUINS　　　　2,477,452
VEHICLE DRIVE CONTROL MECHANISM
Filed Oct. 16, 1945　　　　2 Sheets-Sheet 1
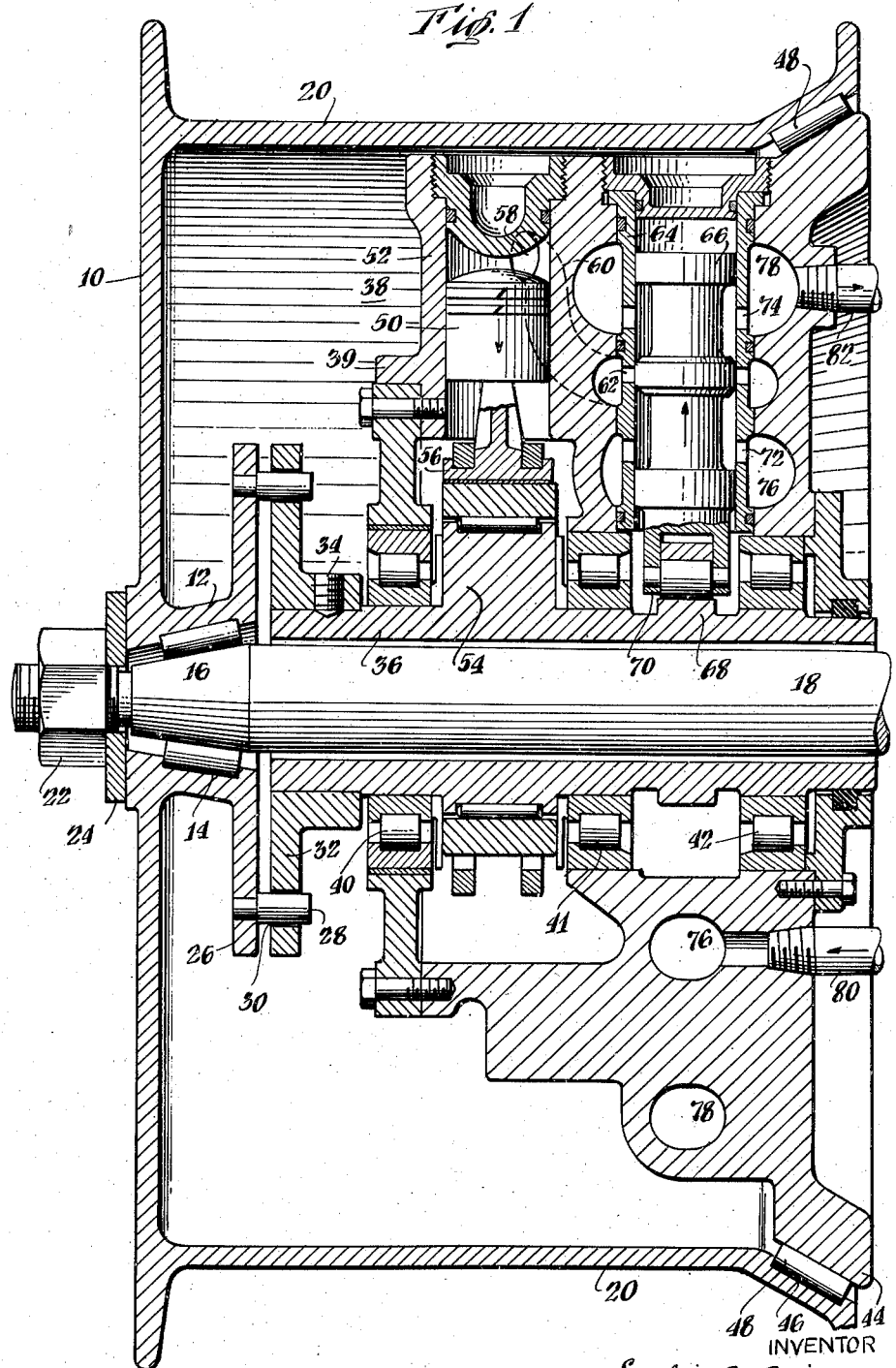
INVENTOR
Sergei G. Guins
BY
ATTORNEYS July 26, 1949.  S. G. GUINS  2,477,452
VEHICLE DRIVE CONTROL MECHANISM
Filed Oct. 16, 1945  2 Sheets-Sheet 2
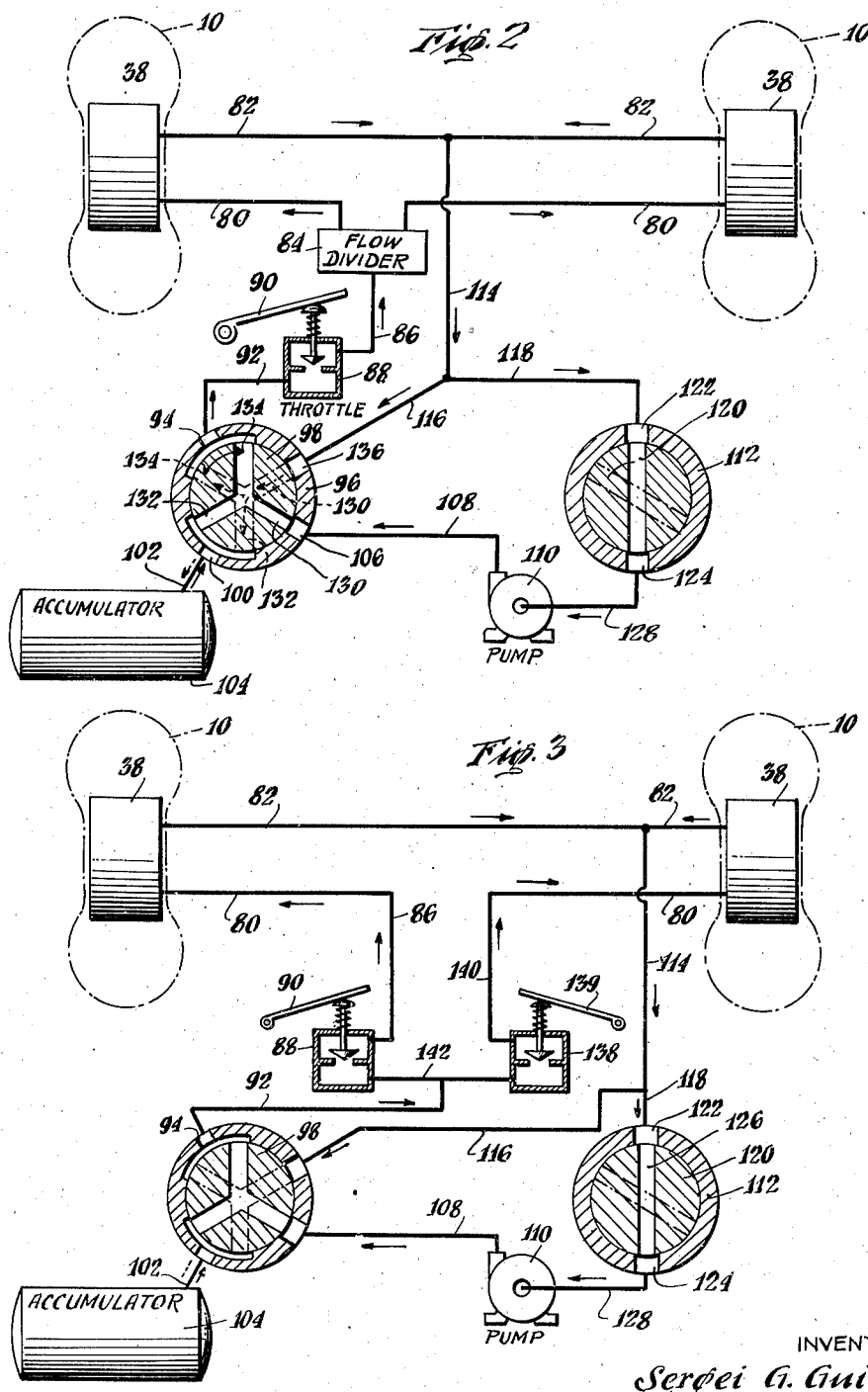
INVENTOR
Sergei G. Guins
BY
ATTORNEYS Patented July 26, 1949

2,477,452

UNITED STATES PATENT OFFICE 2,477,452

VEHICLE DRIVE CONTROL MECHANISM

Sergei G. Guins, Stamford, Conn., assignor to The Aerotorque Company, Stamford, Conn., a corporation of Connecticut Application October 16, 1945, Serial No. 622,572

3 Claims. (Cl. 244—103)

This invention relates to a vehicle drive control mechanism, particularly to a hydraulic control arrangement for aircraft, and has for an object to control the rotation of aircraft landing wheels.

One of the problems incident to landing airplanes on the ground is the frictional resistance set up by contact of the wheels with the ground, whereby the material of the tires is severely cut and worn, the life thereof being appreciably reduced. Several remedial expedients have been proposed heretofore, such as by addition of vanes to the sides of the tires for pre-rotating the wheels prior to landing. Although the use of vanes substantially reduces wear and tear on the tires, it does not provide positive rotative control thereof both before and after the landing operation, the plane being generally brought to a stop, as far as applicant is aware, by employment of the usual frictional type of brake. Positive control of the plane wheels is required, especially at take-off, to stop rotation of the wheels immediately upon leaving the ground as rotating wheels increase the drag and decrease the lifting power of the plane.

It is, therefore, another object of the invention to provide an improved drive control mechanism for aircraft landing wheels in which frictional type brakes are eliminated therefrom and in which positive control thereof may be maintained at all times.

A further object of the invention is to provide an improved control mechanism for aircraft landing wheels in which hydraulic power is utilized for pre-rotating the wheels prior to landing the aircraft and for braking the aircraft to a stop after landing.

A still further object of the invention is to provide an improved drive control mechanism in which hydraulic power is utilized for steering the vehicle on the ground.

With the above objects in view, one embodiment of the invention discloses a hydraulic unit carried by each of the two front landing wheels of an aircraft, a flow divider for providing balanced liquid flow to the individual units, so that the wheels will rotate at the same speed, a throttle valve for varying the speed of the landing wheels, and a manually-operated valve for controlling the function of the hydraulic units, that is, in one position of the valve the units will operate as motors to pre-rotate the landing wheels and in the other position the units will operate as pumps to brake the wheels. Hydraulic power from a common hydraulic system is provided for the aircraft. An accumulator is also provided for absorbing some of the power during the braking period, this power being utilized to drive the units as motors during the pre-rotating period.

In another embodiment the wheels are shown individually controlled through a pair of throttle valves connected in parallel for providing improved positive steering control of the aircraft on the ground, the throttle valves being utilized both as a flow divider and for varying the liquid flow through the two units individually.

A more complete understanding of the invention will be obtained from the detailed description which follows and by reference to the appended drawing in which:

Fig. 1 is a sectional view of an aircraft wheel mounting having an hydraulic unit fixedly secured thereto, Fig. 2 is a circuit diagram illustrating the interconnecting elements of a hydraulic system for providing equal rotation of the wheels through use of a flow divider, and Fig. 3 is a circuit diagram of another embodiment illustrating interconnecting elements for providing individual control of the hydraulic units.

Referring to the drawings, particularly to Fig. 1, there is shown a frame 10 of a landing wheel having an inner tapered sleeve 12 journalled upon anti-friction bearings 14, in turn mounted upon a beveled portion 16 of a stationary shaft 18, which may be fixedly secured in any suitable manner to the body of a vehicle, such as an aircraft (not shown). An outer flange 20 is provided for supporting the usual pneumatic tire (not shown). As is well known, two landing wheels are usually mounted in the fore part of an aircraft, but for the purposes of this invention one wheel only need be illustrated in detail, the over-all system being shown schematically in Figs. 2 and 3, as will be described hereinafter. A nut 22 with a spacer 24 threadedly mounted upon a reduced section of the shaft 18 rotatably secures the wheel frame 10 in position.

At the inner end of tapered sleeve 12 is shown a flange 26 having a plurality of inwardly projecting bolts or pins 28 adapted for insertion in complementary apertures of a flange 32 fixedly secured, such as by a set screw 34, to a rotatable tubular shaft 36 of a fixed displacement fluid pressure energy translating device 38. Two identical devices or hydraulic units 38 are provided, one for each wheel, and both units may function either as pumps or motors. Hydraulic unit shaft 36 is rotatably supported in a casing or housing 39 upon a plurality of anti-frictional bearings 40, 41, 42, housing 39 having an outer beveled peripheral portion 44 parallel with a bearing portion 46 in outer flange 28, intermediate which are suitably provided anti-frictional bearings 48. While not shown, the housing 39 of each hydraulic unit 38 is rigidly secured in any suitable manner as by bolts, to the aircraft vehicle frame. It is thus readily apparent that the wheel frame 10 is journalled upon aircraft stationary shaft 18 and also upon the stationary housing 39 of the hydraulic unit 38, unit shaft 36 being rotatable therewith.

The hydraulic unit 38 may be of any suitable type and, as shown, is of the radial double-acting valve type comprising a plurality of working pistons 50 reciprocably movable within associated cylinders 52 and articulated by an eccentric 54, when operating as a pump or vice versa when operating as a motor, on shaft 36 through a connecting rod-slipper assembly 56. Each cylinder 52 is provided with a port 58, which is connected by a passage 60 to a port 62 disposed within a valve cylinder 64 provided in the housing 39. A valve body 66 for controlling liquid flow to and from the working cylinder 52 is reciprocably movable within cylinder 64 and is articulated by a valve eccentric 68, preferably integral with shaft 36, through a connecting rod assembly 70 of any well-known type. An inlet port 72 and an outlet port 74 are provided in the cylinder 64 for connection with port 62 and also with inlet manifold 76 and outlet manifold 78, respectively. For connecting the hydraulic unit 38 to the remainder of the hydraulic system, to be described hereinafter, inlet and outlet conduits 80, 82 are shown secured to the housing 39 and connected to the manifolds 76, 78, respectively.

In operation, the hydraulic unit 38 may function either as a pump or motor, as mentioned hereinbefore. If operated as a motor for pre-rotating the landing wheels, upward movement of valve body 66, in the direction of the arrow, will cause liquid to flow from inlet manifold 76 via port 62 and passage 60 into the cylinder 52 to drive the working piston 50 downward, thereby rotating shaft 36, which, being keyed to wheel frame 10, will pre-rotate the landing wheel at a speed in accordance with the fluid input. For the hydraulic unit 38 to function as a pump for braking the landing wheels, the wheel frame 10 will be rotated by friction contact with the ground. In this instance the shaft 36 will articulate the working piston 50 which, in the position shown in Fig. 1, will similarly move in a downward direction, as shown by the arrow, to draw hydraulic liquid into the cylinder 52 from inlet manifold 76, port 62 being opened by upward movement of valve body 66. Inlet and outlet conduits 80, 82, respectively connect each hydraulic unit 38 to the hydraulic system, which will be described hereinafter.

Referring now to Fig. 2, there is shown diagrammatically a hydraulic system in which the invention is embodied. Using like characters for like parts, a pair of landing wheels 10 is shown with hydraulic units 38 disposed therein in block form, inlet conduits 80 for each of the units 38 being connected to a flow divider 84, of the usual type, which is adapted for directing equal quantities of liquid regardless of resistance into these conduits 80 to cause both hydraulic units 38 to rotate their shafts 36 synchronously. The other side of the flow divider 84 is connected by a conduit 86 to a throttle valve 88, the opening of which is controlled by a spring-biased pivotal lever 90, preferably of the foot pedal type. It is apparent that the throttle valve 88 restricts the flow of liquid therethrough, and controls the speed and torque resistance of hydraulic units 38. The throttle valve 88 is connected by a conduit 92 to a port 94 in a manually-operated control valve 96 of any suitable type, such as a rotatable one with two levels.

As shown, valve 96 comprises a valve body 98 which may be rotated to two positions, one in which the hydraulic unit 38 will operate as a pump and the other in which it will operate as a motor. The pump operating position of the valve body 98 is shown in solid lines while the motor operating position is shown in dotted lines. The valve 96 is connected through a port 100 and conduit 102 to an accumulator 104 and also through a port 106 and conduit 108 to a pump 110. The accumulator 104 and pump 110 are usually provided as part of the hydraulic system of an aircraft and are merely utilized in this invention to provide the necessary hydraulic source. The outlet conduits 82 of the hydraulic units 38 are shown connected to a common conduit 114 and the liquid circuit is then split into two paths, one leading via conduit 116 to valve 96 and the other path via conduit 118 to a valve 112 disposed, say at a level below that of valve 96 and having a rotatable valve body 120 mechanically coupled with valve body 98, so that both valve bodies are rotated concurrently. Valve body 120 permits liquid flow through the valve when in the solid line, namely, pre-rotating position and interrupts liquid flow in the dashed line or braking position, ports 122, 124 being provided in valve 112 and a passage 126 in valve body 120 for permitting liquid flow therethrough. A conduit 128 interconnects valve 112 with the pump unit 110.

In operation, assuming that the aircraft is preparing to land, the landing wheels 10 should be pre-rotated by the pilot so that the surface speed thereof will be approximately equal to the indicated air speed at the moment of contact with the ground. At this optimal speed there will be substantially frictionless contact at the instant the tires strike the ground, thereby effectively reducing wear and tear on the tires. For pre-rotating the landing wheels 10, the hydraulic units 38 will be operated as motors, the hydraulic energy being obtained from the accumulator 104 and pump 110. The hydraulic circuit may be traced along one path from the pump 110 via conduit 108, through port 106, passage 130 in valve body 98, and along the other path from the accumulator 104 via conduit 102, port 100, passage 132 in valve body 98, both paths converging through passage 134 in valve body 98 and thence through port 94, conduit 92, throttle valve 88, and conduit 86, to the flow divider 84, where the liquid is divided into two equally flowing branches and passed through inlet conduits 80 into both hydraulic units 38, the shafts 36 of which rotate synchronously; the liquid is discharged from the units 38 through outlet conduits 82 and returns via conduits 114, 118, port 122, passage 126, port 124, and conduit 128 to the pump 110. No return path is provided to the accumulator. The rate of flow of liquid through the hydraulic units is controlled by the throttle valve 88, the smaller the aperture through the throttle valve the lower the rate of speed of the two units.

Upon landing the aircraft on the ground, it will be next assumed that the aircraft will be braked to a stop. Accordingly, the pilot will rotate the valve bodies 98 and 120 to their alternate positions, approximately 60°, to cause the units 38 to function as pumps by absorbing energy through frictional resistance of the landing wheels 10 with the ground, as described hereinbefore. The liquid flow will continue in the same direction through inlet and outlet conduits 80, 82, respectively, but will be changed through the passages of valve 96, as shown by the dashed lines and arrows, and will be cut off from the pump 110 by valve 112. To clarify the liquid flow, the circuit will be re-traced in its entirety. Since the hydraulic units 38 absorb power by movement of the wheels 10 with the ground, the liquid will be driven from the units 38 through outlet conduits 82, conduits 114, 116, into a fourth port 136 and passage 130 of valve 96, and thence into two paths, one path being traced through passage 132, port 100 and conduit 102 into the accumulator 104, which is charged, and the other path through passage 134, port 94, conduit 92, throttle valve 88, conduit 86, and thence through flow divider 84 and inlet conduits 80 back to the hydraulic units 38. The opening of the throttle valve 88 may be varied, as in the previous example, to control the retardation or braking effect of the hydraulic units 38 in accordance with the rate at which the wheels are to be stopped. It is thus seen from the foregoing that an aircraft in landing may have its landing wheels pre-rotated at the proper surface speed and that after landing on the ground the wheels may be braked to a stop in a positively controlled manner.

In Fig. 3, which is similar to Fig. 2, a second throttle valve 138 has been substituted for the flow divider 84 to provide individual control of the landing wheels 10, a spring-biased pivotal lever 139, also of the foot pedal type, being adapted to vary the opening of this throttle. As shown, a conduit 140 connects throttle valve 138 with the right inlet conduit 80, as viewed in the figure, and a conduit 142 is interposed between throttle valves 88 and 138, so that both throttle valves are in parallel with each other. The functions of the hydraulic system, as shown in Fig. 3, are somewhat similar to those described for Fig. 2, the liquid flow through both inlet conduits 80 being varied in accordance with the position of the pivotal levers 90, 139. An advantage, moreover, is obtained with the pair of throttle valves 88, 138 after the aircraft has been landed, namely, to taxi or steer the plane to any position on the field.

In other words, if it is desired to steer the aircraft to the right, throttle valve 138 would be partially closed to diminish liquid flow through the right hydraulic unit 38 (as viewed in Fig. 3), the associated wheel 10 functioning as a movable pivot while the throttle valve 88 may be opened slightly wider than the opening in throttle 138 or left in the same position, depending on the circumstances, thereby rotating the left landing wheel 10 at a greater speed than the right landing wheel. It is apparent that the aircraft can be steered to any position on the field, in a manner similar to that of the well-known tractors, by varying the rotative speeds of the individual landing wheels 10. This steering control can be accomplished immediately upon landing while the valve bodies 98, 120 are in their braking positions, the hydraulic units 38 functioning as pumps, or taxied from a resting condition with the valve bodies 98, 120 in their pre-rotating positions, the hydraulic units 38 functioning as motors.

While this invention has been shown and described in certain particular embodiments merely for the purpose of illustration, it is, of course, understood that various modifications may be made in the general principles of this invention without departing from the scope thereof, as defined in the appended claims.

What is claimed is:

1. In a vehicle of the type having a pair of wheels in which turning is accomplished by controlling the relative velocity of the wheels, the combination of a positive displacement hydraulic unit connected to each of said wheels, a source of hydraulic energy adapted for driving the units, and operator controlled means including individual throttle valves for variably regulating the rate of liquid supply to each of said units, whereby said vehicle may be steered.

2. In a vehicle of the type having a pair of wheels in which turning is accomplished by controlling the relative velocity of the wheels, the combination of a positive displacement hydraulic unit connected to each of said wheels, a source of hydraulic energy adapted for driving the wheels, inlet and outlet hydraulic lines interconnecting said source and said units, and operator controlled means including individual throttle valves in each of said inlet lines for variably regulating the rate of liquid supply to each of said units, whereby said vehicle may be steered.

3. In an aircraft vehicle of the type having a pair of wheels for controlling movement thereof, the combination of hydraulic means for pre-rotating and braking said wheels, said means comprising a positive displacement hydraulic unit including a shaft coupled to and revolvable with each of said wheels, means including inlet and outlet conduits for connecting said units to a common hydraulic supply provided in the vehicle, means including a flow divider connected to said inlet conduits and serially interposed between said hydraulic supply and said units for synchronizing rotation of said units, operator controlled means including a throttle valve interposed between said flow divider and said hydraulic supply for varying the speed of rotation of said wheels, and manually controlled valve means for controlling the operating functions of said units, whereby at one instance the units may be employed as motors for pre-rotating said wheels prior to landing and at another instance as pumps for braking said wheels after the aircraft has landed, said valve means including a pair of jointly operated valves, one of which is interposed between the throttle valve and the hydraulic supply and the other of which is interposed between the outlet conduits and the hydraulic supply.

SERGEI G. GUINS.

REFERENCES CITED

The following references are of record in the file of this patent:

UNITED STATES PATENTS

| Number | Name | Date |
|---|---|---|
| 1,021,338 | Rush | Mar. 26, 1912 |
| 1,977,033 | Adams | Oct. 16, 1934 |
| 2,266,921 | Trautman | Dec. 23, 1941 |
| 2,381,842 | Schwend | Aug. 7, 1945 |
| 2,418,123 | Joy | Apr. 1, 1947 |

FOREIGN PATENTS

| Number | Country | Date |
|---|---|---|
| 520,994 | Great Britain | May 9, 1940 |